(12) United States Patent
Maggiore et al.

(10) Patent No.: US 9,199,202 B2
(45) Date of Patent: Dec. 1, 2015

(54) FILTER ELEMENT ATTACHMENT, FILTER CARTRIDGE, AND FILTER SYSTEM

(75) Inventors: Frank Maggiore, Port Jefferson Station, NY (US); Leon Vanwormer, Ronkonkoma, NY (US)

(73) Assignee: Sartorius Stedim Biotech GmbH (DE)

( * ) Notice: Subject to any disclaimer, the term of this patent is extended or adjusted under 35 U.S.C. 154(b) by 53 days.

(21) Appl. No.: 13/233,505

(22) Filed: Sep. 15, 2011

(65) Prior Publication Data

US 2013/0068673 A1    Mar. 21, 2013

(51) Int. Cl.
| | | |
|---|---|---|
| *B01D 35/00* | (2006.01) | |
| *B01D 24/00* | (2006.01) | |
| *B01D 65/00* | (2006.01) | |
| *B01D 35/30* | (2006.01) | |
| *B01D 65/10* | (2006.01) | |

(52) U.S. Cl.
CPC ............... *B01D 65/00* (2013.01); *B01D 35/30* (2013.01); *B01D 65/102* (2013.01); *B01D 2201/52* (2013.01); *B01D 2201/56* (2013.01); *B01D 2313/20* (2013.01)

(58) Field of Classification Search
None
See application file for complete search history.

(56) References Cited

U.S. PATENT DOCUMENTS

| | | | | |
|---|---|---|---|---|
| 3,556,411 A | * | 1/1971 | Nord et al. | 239/581.1 |
| 3,591,002 A | * | 7/1971 | Rosaen | 210/90 |
| 4,384,474 A | | 5/1983 | Kowalski | |
| 4,704,517 A | * | 11/1987 | Campisi et al. | 235/382 |
| 4,753,520 A | * | 6/1988 | Silverglate | 359/365 |
| 4,794,238 A | * | 12/1988 | Hampton | 235/462.32 |
| 6,024,867 A | * | 2/2000 | Parise | 210/87 |
| 6,178,290 B1 | * | 1/2001 | Weyrauch et al. | 392/445 |
| 7,326,334 B2 | | 2/2008 | Boyd et al. | |
| 8,097,158 B2 | | 1/2012 | Tubby et al. | |
| 2004/0084027 A1 | * | 5/2004 | Grant | 123/447 |
| 2006/0157391 A1 | * | 7/2006 | Astle et al. | 210/85 |
| 2006/0186026 A1 | * | 8/2006 | Saleh | 210/134 |
| 2006/0207920 A1 | * | 9/2006 | Lackey et al. | 210/87 |

OTHER PUBLICATIONS

Chinese Patent Appl. No. 201280044152.0—Office Action/Search Report issued Oct. 27, 2014.

* cited by examiner

*Primary Examiner* — Nam Nguyen
*Assistant Examiner* — Richard Gurtowski
(74) *Attorney, Agent, or Firm* — Gerald E. Hespos; Michael J. Porco; Matthew T. Hespos (57) ABSTRACT

A filter element attachment is provided and is attachable to a filter element. The filter element attachment includes a housing for receiving at least a part of the filter element; at least one display configured to display information associated with the filter element. The filter element attachment may be associated with a corresponding filter cartridge and a filter system.

10 Claims, 9 Drawing Sheets

FILTER ELEMENT ATTACHMENT, FILTER CARTRIDGE, AND FILTER SYSTEM

BACKGROUND OF THE INVENTION

1. Field of the Invention

The present invention relates to improvements for controlling a filter system in use as well as a corresponding filter cartridge, which is used for filtering or which is under test, with respect to its permeability. Accordingly, the invention relates to the corresponding filter cartridge and a filter element attachment, which can be attached a filter element to form the filter cartridge.

2. Description of the Related Art

As it is known from document U.S. Pat. No. 4,384,474 A at least one membrane filter cartridge can be installed in a filter testing device in order to test the integrity of the membrane filter cartridge. The filter testing device comprises a sight glass which is arranged to observe gas bubbles in an outlet, when air pressure is applied to the filter cartridge and the air is leaking through an defective part of the membrane filter cartridge. However, the filter cartridge itself is hidden in the filter testing device and an user of the filter testing device has to mark or register manually whether the filter cartridge has passed or failed the test.

Thus, an object of the present invention is to propose a filter element attachment, a filter cartridge and a filter system that allow an improved monitoring of a filter element test and an improved handling of the filter cartridge and the filter system.

SUMMARY OF THE INVENTION

According to the invention, this object is attained by the subject-matter of the independent claims. Preferred embodiments of the invention are set forth in the dependent claims.

One aspect of the invention is related to a filter element attachment attachable to a filter element comprising: fixing means for receiving at least a part of the filter element; at least one display means configured to display information associated with the filter element.

The filter element is advantageously configured to provide information of the filter element by presenting this information via the display means. The display means may change the display information depending on the state of the filter element or its environment.

The filter element may be a membrane filter or a filter candle, which may comprise a filter ceramic or filter fabric. Particularly, the filter element is sterile filter element. The filter element can be at least partly received by the fixing means of the filter element attachment. This may include that the fixing means are formed complementary to a part of the filter element to be received. The filter element attachment can be attached to the filter element via the fixing means removably or non-removably. For example, the filter element attachment and the filter element may be welded, glued, molded, crimped, screwed, snapped or stuck together. Accordingly, the fixing means may comprise screws, flanges, welding material, molded material, glue and so on.

The at least one display means may include a laser, an Infrared Light Emitting Diode (LED), a visual LED, an ultraviolet LED, a sound emitting device, such as a speaker, a microwave emitting device, a radio wave emitting device, such as an RFID tag or a near-field communication (NFC) tag, a photon or other light spectrum emitting devices, such as an electronic ink display, an Liquid Crystal (LCD) display, an LED display, a plasma display, a 3D display, a touchscreen display, or other visual display device. The at least one display means may be also any one of a one-dimensional barcode, a two-dimensional barcode, and an imprint. The barcodes may be also displayed via a dynamic display, such as an LCD display, and LED display and so on. Particularly, when two or more display means are provided to the filter element attachment one of the display means may be a static display means, which is not configured to change the displayed information, for example a serial number.

The information displayed may comprise, the type of the filter element, the production date, serial number, pore size, water retention, sterility, actual pressure on each of the side of the filter membrane, actual temperature, and so on.

The filter element attachment may be at least partially formed out of a transparent of translucent material, such as polypropylene or polycarbonate. Thus, the display means can be observed through the translucent or transparent material of the filter element attachment.

The filter element attachment may further comprising a processing device for controlling at least one display means. The processor device may be a central processing unit (CPU) or a microcontroller. The processor device may control the display device as well as other electronic devices of the filter element attachment.

The filter element attachment may further comprising at least one sensor device. The at least one sensor device may configured to measure at least one physical property of the filter element, the filter element attachment or the environment of both. Properties to be measured by the at least one sensor device may be a temperature, a pressure, a fluid flow, such as a gas flow or a liquid flow, or other properties. For example the sensor device may record the temperature inside of the filter element during a sterilization of the filter element. Thus, it can be proved that the inner temperature of the filter element has reached for example 121 degrees Celsius in order to completely sterilize the filter element. Furthermore, two sensor devices may be provided to measure the hydraulic pressure of a fluid to be filtered on both sides of the filter medium of the filter element, thus, determining the pressure drop over the filter element.

The filter element attachment may further comprising a storage device configured for storing measurement data from the at least one sensor device. The storage device may be configured to store the data measured by the at least sensor device over the lifetime of the filter element attachment or as long as the data could be retrieved from the storage device and subsequently deleted therefrom.

The filter element attachment may further comprising at least one receiving means configured to receive data and to provide the received data to the processing device. The receiving means could be configured to receive optical signals, audio signals or electromagnetic signals. Accordingly, the receiving means may comprise for example an antenna, a microphone and/or a photodetector.

The filter element attachment may further comprising a power source. The power source may be a battery, which may be rechargeable. Alternatively, the power source may comprise an antenna, which is configured to receive the energy consumed by the filter element attachment via magnetic induction or via microwave radiation. Alternatively, the power source may comprise a receiver for receiving a laser beam in order to generate energy form the received laser beam (power beaming).

The filter element attachment may further comprising a remotely controllable power switch configured to switch the power supply of the processor. The power switch may comprise a Reed contact, which is controllable remotely by placing or replacing a magnet near the filter element attachment.

The filter element attachment may further comprising at least one thermal insulation enclosing at least one of the processor, the storage means, and the power source. Thus, the sensitive internal electronic components can be protected from high temperatures during steam sterilization, autoclaving or high temperature use by thermal insulation. For example, one, more or all electronic devices may be enclosed by expanded Polystyrol in order to provide the thermal insulation. This may be necessary in case the filter element attachment as well as the filter element should be sterilized using hot steam. The thermal insulation may also comprise additionally or alternatively epoxies, thermal sinks, separation/barrier insulation, vacuum insulation, and active or passive cooling systems. The insulation can be wrapped around each individual electronic component, the batteries, and wires or it can be wrapped around the entire cavity internal to the top adapter to protect all of the electronic components.

One aspect of the invention is related to a filter cartridge comprising: a filter element and a filter element attachment according to the invention as disclosed above.

Once the filter element attachment is attached to the filter element, which is configured to filter a fluid, the filter cartridge is formed. The filter element attachment can be configured that all of the electronic components included in the filter element attachment adapter would have no fluid contact, when the filter cartridge is in use. However, an exception would be specialized sensors that would require fluid contact to perform their function. As an example the internal sensors can be any one of a temperature sensor, a flow rate sensor, an orientation sensor, a tilt sensor, an accelerometer, a free-fall sensor, an impact sensor, a vibration or acoustic sensor, a weight sensor (or other load bearing sensor), a force gauge, a dosimeter, a metal detector, a motion detector, a dynamic surface tension sensor, a pressure sensor, a concentration sensor, a hygrometer, a conductivity sensor, a viscometer, a rheometer, a chemical sensor, a trace gas sensor, a pH sensor, a light sensor, a luminance sensor, a dissolved oxygen sensor, a carbon dioxide sensor, a glucose sensor, a protein concentration sensor or an assay sensor. These sensors can be embedded within the upstream portion of the filter element attachment or on the downstream side with placement in the middle of the filter element attachment bottom weld. Alternatively, any one of the sensors may be placed at and/or in the filter element being communicatively connected to the processing device of the filter element attachment by wired and/or wireless connection.

The data displayed by the display means of the filter element attachment of the filter cartridge can alter based on sensor data, a set timing, and/or further conditions. The messaging on the visual display system can include multiple barcodes (including two dimensional datamatrix codes) that can be scanned by a barcode scanner to provide coded data insertion into various software fields, such as for an integrity tester. The display means of the filter element attachment could be used for simple updateable charts, such as the change in temperature sensor data over a period of time, or for visual animations such as the visual instructions for properly wetting and integrity testing a filter. The display means could also provide images of visual markers that could be used in an augmented reality display with an external camera and display system. The augmented reality markers could also be presented through an infrared LED array that can provide information to an augmented reality system through a display of text, symbols, iconography, or pulsating light patterns which can be viewed by a camera that can detect the presented infrared wavelength. This augmented reality display could provide a link to additional information about the filter element such as datasheets, validation guides, and directions for use as well as three dimensional animations for processes involving the filter including visual, audio, or text demonstrations for following the proper standard operating procedures with the filter cartridge or capsules.

Additionally an encrypted code can be embedded into the data storage and/or processing device which is read by an external communication device and identifies the filter element and/or assembled components as a manufacturer's original device. This will prevent counterfeit filter elements and/or associated components from being assembled in a filtration system where the quality was not controlled by the manufacturer of the original device. This data can be transmitted through the external communication device to a linked network, mobile device and/or associated equipment such as an automated integrity testing device which can prevent further setup or the operation of the filtration device until a verified component is used in place of the counterfeit component.

One aspect of the invention is related to a filter system comprising: a filter housing with at least one sight glass, and a filter cartridge according to the invention, which is received by the filter housing, wherein the at least one display means is visible through the at least one sight glass.

The filter element can be welded to the filter element or molded together with the filter element in a capsule. The sight glass has to be incorporated into the filter housing in a way, that a filter cartridge (a filter cartridge according to the invention as disclosed above or a general filter cartridge) inserted in the filter housing can be at least partly observed visually by a user. The filter cartridge's circumference or the complete filter cartridge may be observed by the user during the performance of a measurement or a production method using the filter system. The purpose of the sight glass is to allow the user to access information located inside of the filter housing and on installed filter cartridges or elements. The user may observe the visible surface of the filter cartridge in order to monitor the filter conditions, such as bubbles breaking through the filter material.

Accordingly, the user may scan a barcode located on the filter cartridge with a barcode scanner while the cartridge is inside of the filter housing. Information transmitted from sensors located inside of the housing or on the top adapter of a filter cartridge or element can also be viewed through the sight glass by an operator and/or a communication device. From the communication device the measured data may be transmitted to an external processing device for processing and storing the measured data. The data could be used for quality control of the process carried out. A plurality of sight glasses can allow for a diverse array of increased functionality for observing the filter conditions during filtration and processing from different angles.

One or more sight glasses incorporated into the filter housing will allow an operator to access conditions and information inside the housing (upstream of the filter) as well as from the filter cartridges and/or filter elements. The sight glass can be incorporated into a filter housing containing a filter cartridge or a filter capsule, as a preferred housing, containing a filter element. The sight glass has to be configured to withstand the pressure applied during the filtering carried out with the filter system. Accordingly, the sight glass is fluid proof for a pressure inside the filter housing up to about 100 kPa, preferably up to about 500 kPa or more preferably up to about 1 MPa. The filter housing, except for the sight glass, may be formed of stain less steel. The sight glass may be formed of tempered glass, a polymer (e.g. acrylic glass or other translucent/transparent polymers) or a metal (e.g. transparent titanium and zirconium).

Information from inside of the filter housing can be attained through several methods including scanning the barcode located on the filter cartridge through the sight glass with a barcode scanner while the cartridge or element is inside of the filter housing. Information about the filter cartridge or element and any associated or embedded sensors can also transmit information via optical signals, such as signals generated by infrared, ultraviolet, visible, and/or spectrum light sources like light emitting diodes (LED's) embedded into the filter element attachment of the filter cartridge. The optical signals can be detected through the sight glass by a camera or other detection device.

Additionally a changeable visual display device (for example an LCD display, an LED display, an electronic ink display, etc. . . . ) can be embedded into the filter element attachment that can be observed by the user or an external communication device through the sight glass. In the case of a filter capsule the display device can be attached to the capsule body and viewed by the user or an external communication device through a transparent body, a sight glass or a display window. The display device and any associated components (such as a battery, wires, switches, processor, internal memory, and sensors) can be completely or partially embedded into the filter element attachment of the filter cartridge on either the upstream side and/or downstream side of filtration with little to no contact of the sensor with the filtered fluid depending on the sensor type used. The sensors may be connected via internal wiring to a processing device and/or storage device or datalogging device. This processing device can convert the sensor data into light pulses sent to the external communication device from the display means, for example an internal infrared LED. The external communication device may verify the data by sending a checksum response back to the filter element attachment where the message can be read by a phototransistor, a camera, and/or an infrared detector. The internal processing device of the filter element attachment can verify the accuracy of this data and continue to transmit the new data. If the optical transmission is lost to the external communication device for whatever reason the processor can store the information in the storage device for transmission at later time when the connection is reestablished.

The display means, respectively the light source or display, can be viewed through the translucent or transparent filter element attachment, which may be formed of polypropylene, polycarbonate, or other transparent material.

A plurality of sight glasses can be located at different areas of the filter housing for a variety of purposes. These include a sight glass that wraps around the length of the housing and/or along the circumference of the filter housing to observe bubbles during a reverse pressure leak test which can detect a leakage in the setup or filter membrane when filled with fluid. A macro lens camera with LED lights can be mounted onto a sight glass to detect/document filter cake layer formation and/or plugging. A thermal imaging camera can be used to view temperature fluctuations during the fluid flow of materials in the filter housing during filtration or in a reverse flow test with a warm fluid. A laser particle detector can be used to estimate the concentration/number of particles within a defined space or the density of the material inside of the filter housing during filtration. The sight glasses will also allow the user to observe conditions inside of the filter housing during processing.

The filter housing sight glass could also be utilized to transmit wireless power from an external power source located outside of the filter housing to an internal receiver of the filter element attachment used to power sensors, electronic components, and/or devices located within the interior of the filter housing. The internal receiver for an external power source can be centrally located or distributed to each individual electronic device. The use of the sight glass is especially useful for wireless power technologies where line of sight with the power receiving device is required. The sight glass could for example be used to transmit a laser as an external power source for use by internal sensors and/or devices. Wireless power using microwaves, visible light, lasers or other electromagnetic sources can be transmitted via an external power source to an internal receiver such as a solar cell, located on the plurality of internal devices (including sensors, filter cartridges, and other internal devices). The internal receiving devices can be coated with a translucent or transparent material such as polypropylene to prevent fluid contact during processing. The transfer of power wirelessly between these layers of components could result in a loss of efficiency during the energy transfer although the sensor devices are generally small and do not require significant power consumption. The result is that delivery of external power wirelessly could result in smaller, more reliable sensors and devices inside of the filter housing due to less of a requirement for running off of battery power alone. The reliability of the sensor and internal devices would increase since batteries can be negatively affected if not properly insulated by the high temperatures endured during sterilization cycles (steam-inplace, autoclaving, or high temperature operation).

The filter housing may be configured to host a plurality of filter cartridges, like two, three, four or more filter cartridges. Thus, the filter housing may comprise a number of sight glasses that is equal to the number of filter cartridges contained in the filter housing, wherein through each of the sight glasses a corresponding filter cartridge can be observed. The at least one sight glass may comprise glass, tempered glass, Gorilla Glass (Corning), metallic glass (transparent titanium and zirconium), Armormax, Makroclear, Cyrolon, Lexan, Tuffak, Pyrex, Kymax, Plexiglas, polypropylene, polycarbonate, or other translucent and/or transparent materials. The sight glass can be coated with thin films to increase strength, reduce permeability, and prevent fracturing or shattering. The sight glass may be formed as a prism or magnifier to expand the viewing area while reducing the sight glass size.

The sight glass can be held in place into an opening of the filter housing with a series of rivets, screws, or welds. The sight glass could also be irremovably welded into place or use a sanitary connector, gasket and clamp to be removably installed onto the filter housing. The space in between the holders and the glass can be sealed by a series of gaskets. In the case of a filter capsule the sight glass can consist of a translucent or transparent polypropylene molded into place or integrated into the capsule filter housing body for viewing of the internal filter element. On the interior or exterior of the filter housing the sight glass holder can be embedded with magnets or other attachment devices/locking mechanisms to removably attach a plurality of sensor and/or detection devices. The sight glass holder can also feature a rechargeable battery and LED lights to illuminate the interior of the filter housing.

A plurality of sight glasses in various shapes, sizes, and locations around the filter housing can allow for a diverse array of increased functionality for observing the conditions during filtration and processing. The most basic use of the sight glass is as a window into the interior of the filter housing to observe if the filter housing bell is filled with fluid. A sight glass positioned in the line of sight of an installed filter element attachment could be used to read the filter cartridge description or utilize a barcode scanner to electronically read a barcode located on the top adapter. A sight glass located in-line with the filter cartridge body on the filter housing could be used in conjunction with a macro lens camera using LED illumination mounted to the sight glass to take high quality images or video of the filter membrane and detect particle/filter cake layer formation that can be correlated to plugging of the membrane. A laser particle counter on the exterior of the filter housing could be used with the sight glass to determine the size and number of particles in a defined area over a pre-determined time interval. An internal sampling container or area within the filter housing could be used to increase the accuracy of the turbidity and/or concentration results.

Imaging with a fish-eye or multi-lens camera from the top and/or sides of the filter housing could be utilized as a quality and/or investigative test for the filter cartridge or seals and to determine the location of potential high diffusion or hydrophobic areas as well as membrane defects. The filter cartridge can be installed into the filter housing and filled with water. An air source can be used to apply a back pressure (reverse pressure) from the outlet valve into the core of the filter cartridge. Imaging the upstream side of the filter housing can be used for determining the location of bubbles during the Reverse Pressure Bubble test. This test can be used to determine if a stream of bubbles is coming out of a specific area such as the adapter connection which can show that the filter was improperly installed or from the filter membrane in the cartridge which could highlight an area with high diffusion from product residue or a membrane defect. A similar quality test can be performed using a thermal imaging camera. Instead of using air as a back pressure to create bubbles a filter housing is filled with cold water and warm water is pumped into the outlet valve into the core of the filter cartridge. The thermal imaging camera can show areas of excessive heat leakage through the filter cartridge and any suspect areas that should be examined further by integrity testing, smoke testing, or microscopy. This thermal imaging test would also be applicable using air as a fluid where a vent filter could have cold or room temperature air in the housing and hot air can be pressurized into the outlet valve of the filter housing.

The imaging or video function of attaching a camera to the filter housing could also be used for fluorescently labeled materials (such as proteins) that can be observed at certain wavelengths during the filtration process. An upstream and downstream fluorescence detector could be used to determine the quantitative loss of materials (such as proteins) with certain filter membrane types during filterability trials. An external spectrophotometer could also be employed to determine what materials are present in the filter media and in which concentrations. An internal sampling container or area within the filter housing could be employed to increase the accuracy of the fluorescence and spectroscopy results.

The filter system may be configured to provide an optical communication link through the at least one sight glass between an optical communication device of the filter cartridge and an external optical communication device. The optical communication device of the filter cartridge can comprise any one of an electronic ink display, an Liquid crystal (LCD) display, an LED display, a plasma display, a 3D display, a touchscreen display, or other visual display device.

Information from sensors embedded within the filter element attachment or the filter cartridge or any associated sensors located in the interior of the filter housing can also transmit data via the display means through the sight glass to an associated communication device on the exterior of the filter housing via an infrared, ultraviolet, visible and/or other spectrum light source.

For example the filter element attachment of the filter cartridge can emit pulses of infrared light from an infrared LED light source embedded into the filter element attachment which can be detected through the sight glass by an infrared detector. The infrared light of certain wavelengths can travel through most fluids and concentrations during the filtration and process operations and can be detected through the sight glass by a digital camera with an infrared filter, an infrared phototransistor, or a specialized infrared detector. The external optical communication device can comprise any one of a laser barcode scanner, a laser, an Infrared Light Emitting Diode (LED), a visual LED, an ultraviolet LED, a microwave, a radio wave, a photon or other light spectrum emitting device.

An electronic component of the filter cartridge can be remotely controlled by an external control device. An external optical signal from the communication device, which then acts as an external controlling device, through the sight glass could also be utilized to activate the electronic components of the filter element attachment.

The controllable electronic component can be any one of a magnetic sensor, an optical sensor, a capacitive sensor and an electromagnetic sensor.

The external communication device and/or the external control device can be removably attached to the exterior of the sight glass to establish a communication link and/or a control link to the filter cartridge.

Additional objects, advantages and features of the present invention will now be described in greater detail, by way of example, with reference to preferred embodiments depicted in the drawing.

DETAILED DESCRIPTION OF THE PREFERRED EMBODIMENTS

Figure 1:
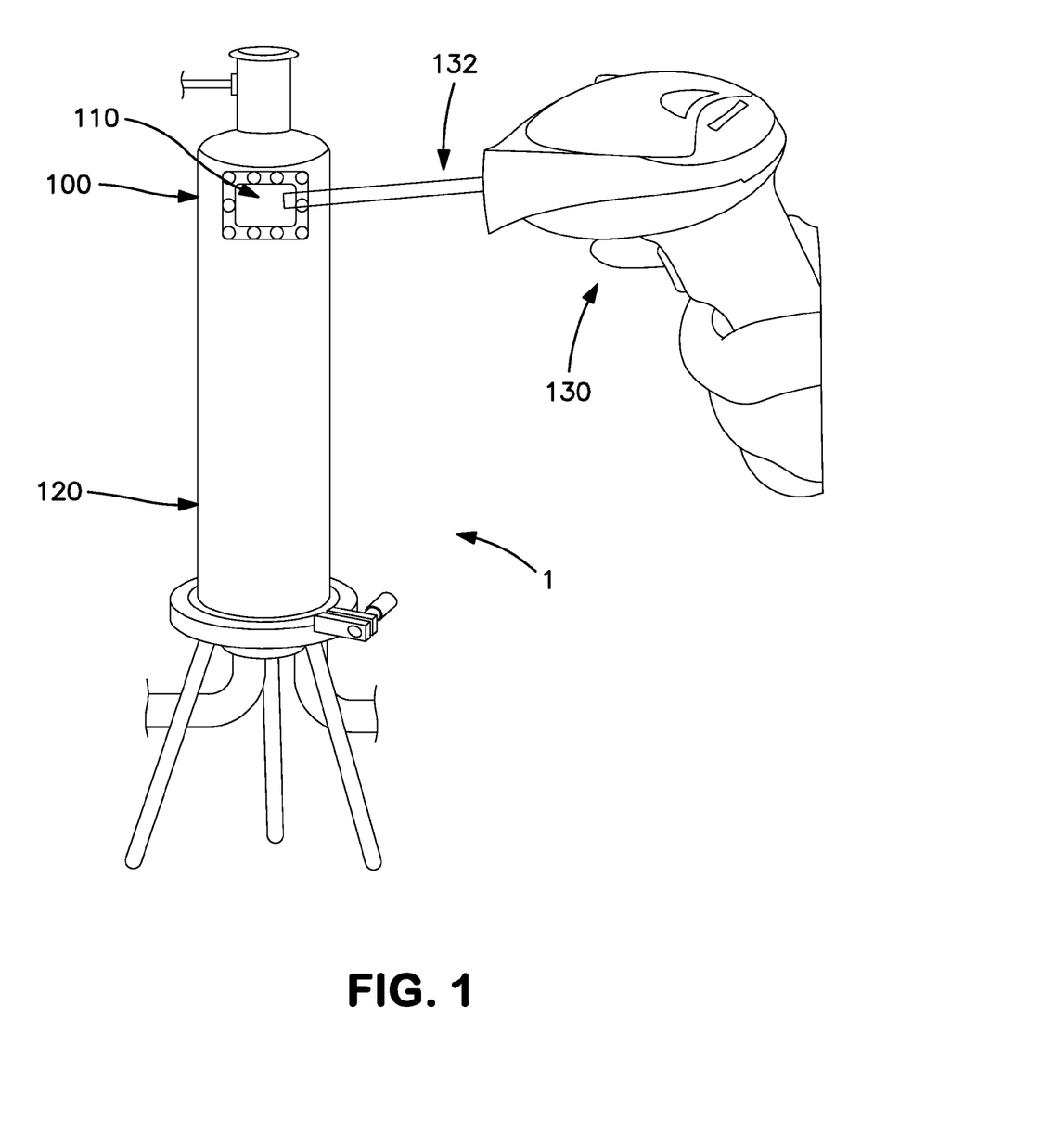
FIG. 1 illustrates an embodiment of a filter system having a filter housing with a sight glass.

FIG. 1 shows a filter system 1 having a filter housing 120 with a wall made of metal, such as stainless steel in order to prevent corrosion. The filter housing may have a bell shape as shown in FIG. 1. A sight glass 100 is covering an aperture of the metal wall of the filter housing 120. Through the sight glass the top a filter cartridge loaded into the filter housing 120 can be observed. The filter cartridge comprises a filter element, such as a membrane filter, and a filter element attachment, which is mounted to top of the filter element. As can be seen in FIG. 1 the filter element attachment 110 adapter of the installed filter cartridge is visible through the sight glass. The filter element attachment 110 may comprise a two-dimensional barcode as a preferred display means 110. Since the barcode is visible through the sight glass 100, it can be scanned by a barcode scanner light beam 132 from an external barcode scanner 130 from the outside of the filter housing 120. Advantageously, the filter cartridge can be identified during the execution of an integrity test and further observations may be associated with the filter cartridge by a user during the integrity test. Furthermore, the two dimensional barcode may comprise additional information regarding the filter cartridge, such as testing parameters used for integrity testing. It has to be understood, that instead of the two dimensional barcode also an alternate barcode system may be used.

Figure 2:
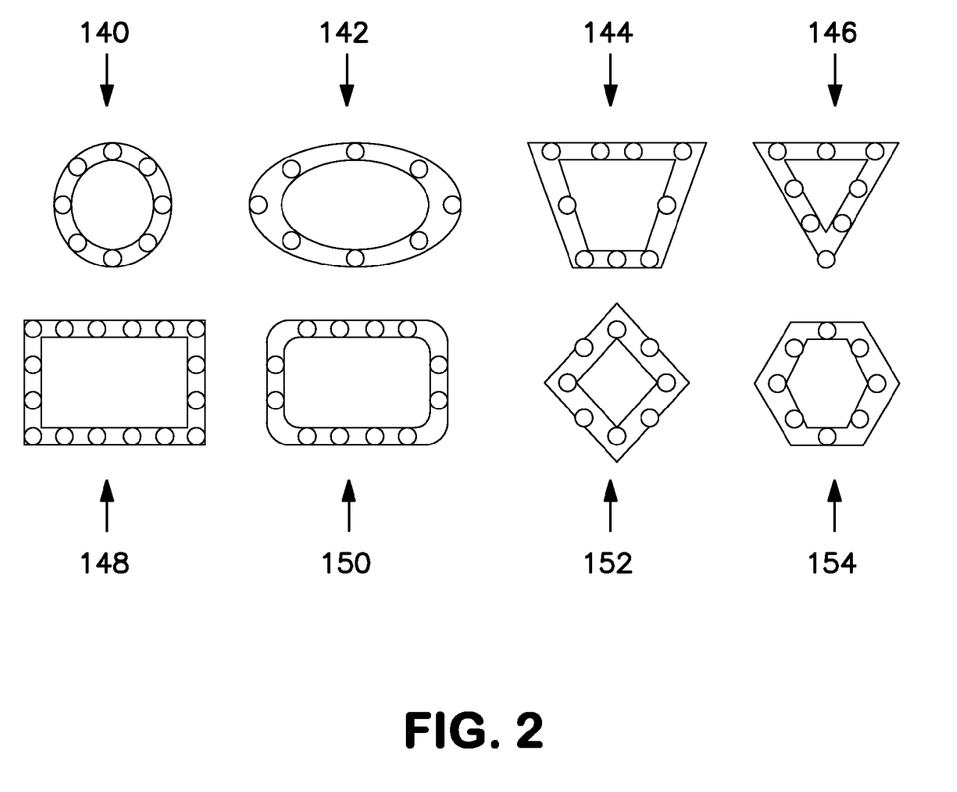
FIG. 2 shows alternative shapes of the filter housing sight glass.

FIG. 2 shows alternative shapes of the filter housing sight glass 100. The sight glass 100 may have various shapes and configurations including sight glasses that are circular 140, oval 142, trapezoidal 144, triangular 146, rectangular 148, rounded rectangular 150, diamond shaped 152, hexagonal 154 or other polygons.

Figure 3:
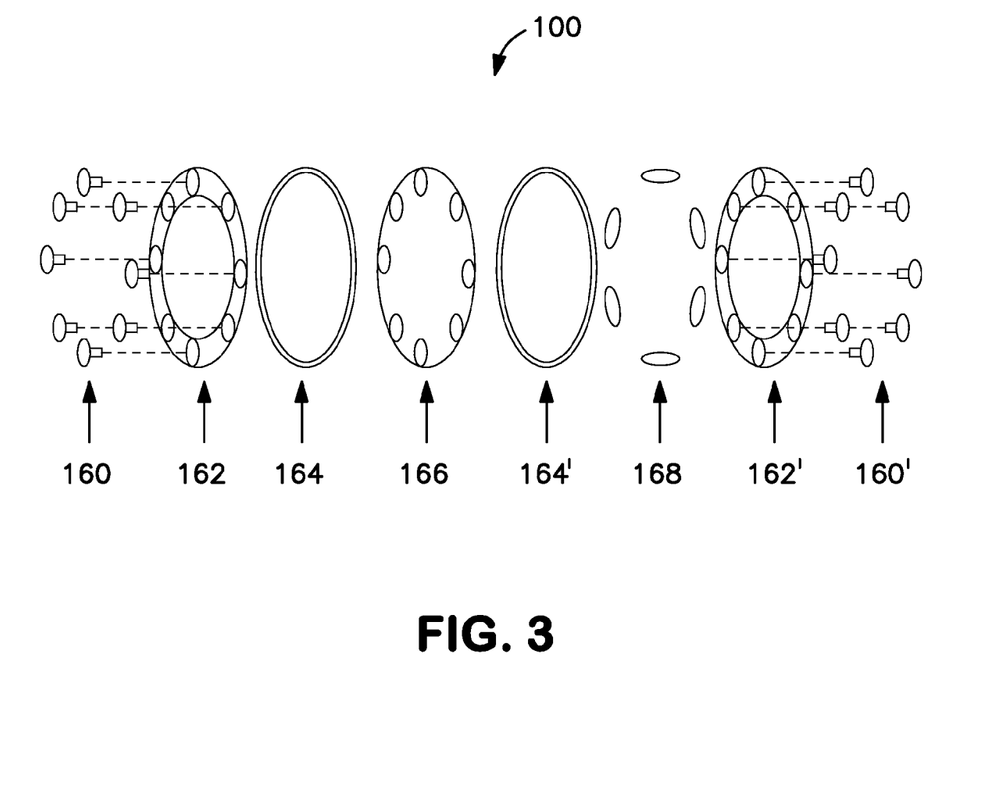
FIG. 3 illustrates an embodiment of the construction of a filter housing sight glass installed into a filter housing.

FIG. 3 is an exploded view of an embodiment of a sight glass 100. The components of the assembly of the sight glass 100 comprises interior glass holders 162 and exterior glass holders 162'; interior attachment devices 160 and exterior attachment devices 160' which may be rivets, screws, or welds; a sight glass 166; interior gaskets 164 and exterior gaskets 164'; and optionally external device attachment means 168 which may comprise magnets or other means to removably lock an external device, such as a control and/or communication device into place in front of the exterior of the sight glass 166. The sight glass 166 can alternately be welded into place or be removably attached with a sanitary connector, gasket, and clamp. The sight glass can be made from a glass, a polymer or transparent metal.

Figure 4A:
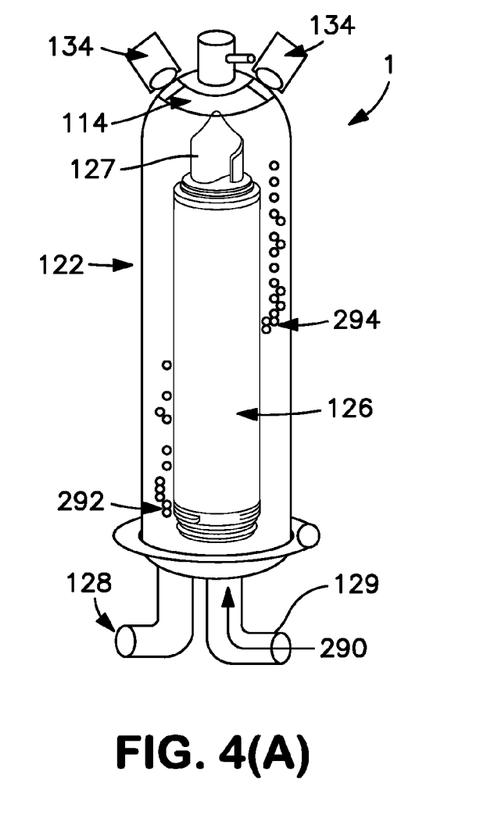
FIG. 4 illustrates another embodiment of a filter system having a filter housing with a sight glass during integrity testing.

FIG. 4 illustrates another embodiment of a filter system 1 during integrity testing conducted using reverse pressure on a filter cartridge 126 in a filter housing 122 utilizing a sight glass 114 installed into the top of the bell shaped filter housing 122. View (A) is a cutaway side view of the filter housing 122 with an installed filter cartridge 126 that is filled with water (not shown). The sight glass 114 may be welded into the top of the filter housing 122 and continues around the circumference of the filter housing 122 allowing an user to view all sides of the interior of the filter housing 122 around the filter cartridge 126. An imaging of the filter cartridge 126 is performed, wherein the images are captured by a series of video camera detectors 134. The inside of the filter housing 122 may be illuminated by an artificial light source, such as one or more LED(s). The filter housing 122 is closed fluid tight (i.e. liquid and/or gas tight) at an inlet 128 and at optional gauge port sides, wherein air pressure 290 is applied on an outlet 129 and, thus, at the core of the filter cartridge 126. Bubbles could be observed from the filter cartridge mounting section 292 indicating a loose filter cartridge connection with the housing base. Bubbles are also observed coming from the filter cartridge membrane 294, which could indicate an area of high diffusion due to product contact or a defect in the membrane. The filter cartridge may comprise a filter element attachment mounting section 127 to which a filter element attachment (as shown in detail in FIGS. 5 to 7) may be mounted to the filter cartridge 126. The information presented by the display means of the filter element attachment may be captured continuously by the video camera detectors 134.

View (B) of FIG. 4 is a cut-away side view of a filter housing 122 with an installed filter cartridge 126 that is filled with ambient air (not shown). The sight glass 114 may be welded into the top of the filter housing 122 and continues around the circumference of the filter housing 122 allowing an user to view all sides of the interior of the filter housing 122 around the filter cartridge 126. An imaging is performed by a series of thermal imaging camera detectors 136. The filter housing 122 is closed fluid tight at the inlet 128 and at optional gauge ports. Hot reverse air pressure 290 is applied through the outlet 129 to the core of the filter cartridge 126. Heat is observed to be coming from the filter cartridge mounting section 296 indicating a loose filter cartridge connection with the housing base. Heat is also observed coming from the filter cartridge membrane 298 which could indicate an area of high diffusion due to product contact or a defect in the membrane. The filter cartridge may comprise a filter element attachment mounting section 127 to which a filter element attachment (as shown in detail in FIGS. 5 to 7) may be mounted to the filter cartridge 126. The information presented by the display means of the filter element attachment may be captured continuously by the thermal imaging camera detectors 136.

Figure 5:
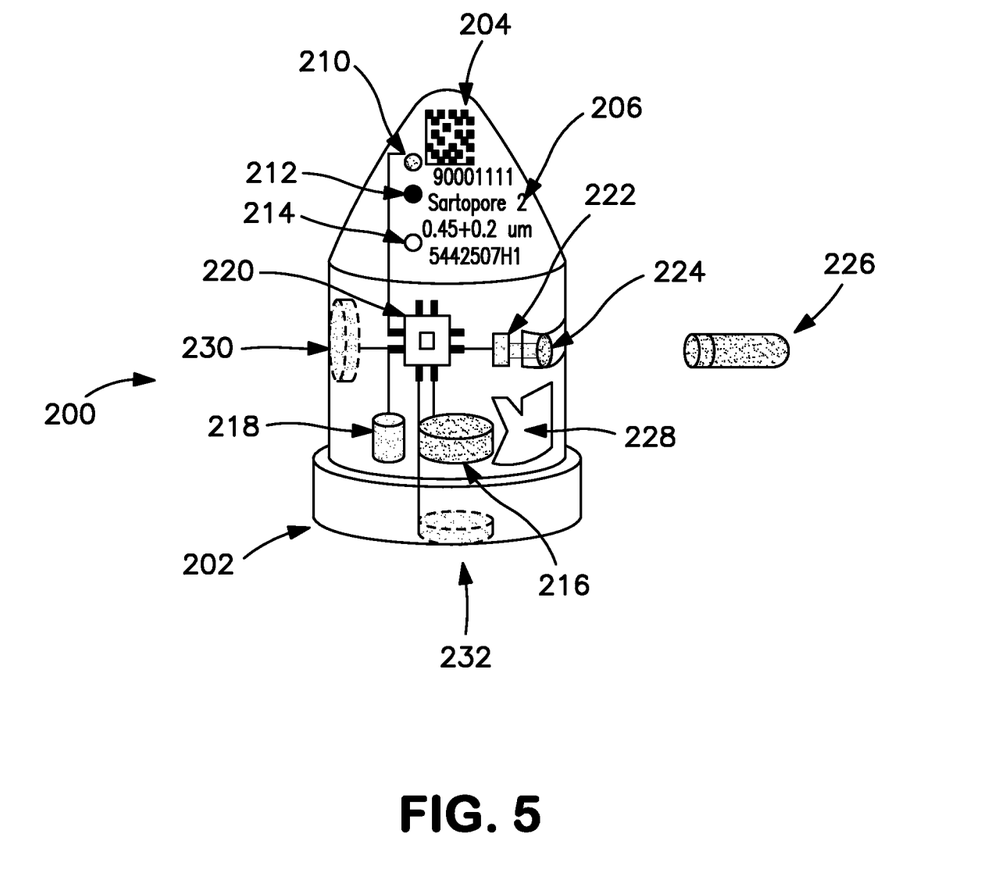
FIG. 5 illustrates an embodiment of a filter element attachment with embedded sensors and electronic devices that can communicate to the outside of the filter housing through the sight glass.

FIG. 5 shows an embodiment of a filter element attachment 200 with embedded sensors and electronic devices that can communicate to the outside of the filter housing through the sight glass. The communication can be carried out using one or more visible light source(s) or light spectrum emitting devices through the filter housing sight glass (not shown) to a detector (not shown) on the exterior of the filter housing. The filter element attachment 200 can be molded to include an enclosable cavity that can contain one or more electronic devices, sensors, and/or systems. The base 202 filter element attachment 200 can be welded or otherwise mounted to a filter element to form a filter cartridge in the sense of the invention. It has to be noted, that the term filter cartridge is also used, in particular in prior art documents, to denote a filter element having no filter element attachment. The fin of the filter element attachment 200 can still include a laser imprinted one or two dimensional barcode 204 and a laser imprinted description of the filter cartridge 206 including the part number, lot number, micron size, etc. characterizing the filter cartridge. The filter element attachment 200 can collect sensor data from a plurality of sensors including a pressure sensitive upstream sensor 230 and a pressure sensitive downstream sensor 232 located in the filter cartridge core. The sensor data can be transmitted to an internal processor 220. Further, the sensor data can be stored by a storage device and/or datalogging device 218 and/or transmitted to an external communication device (not shown) outside the filter cartridge by means of a light emitting device which may be an infrared LED 210 and/or a visual LED 212. A phototransistor or detector 214 embedded in the filter element attachment 200 can receive data transmitted from the external communication device, which may be used for the connection handshake and as a checksum to ensure the integrity of the transmitted and received data. All of the internal electronic components can be powered by a power source, such as an internal battery 216 or an external wireless power source (not shown). The internal electronic components may be switched on and off using a magnetic key 226 that can activate an internal switch 222 associated to an internal magnet 224 all without a mechanical contact. The internal electronic components can be individually or collectively covered with an thermal insulation 228 in order to protect the electronic devices from high heat of 121 degrees Celsius and more, which is used during steam sterilization, autoclaving, or high temperature operation.

Figure 6:
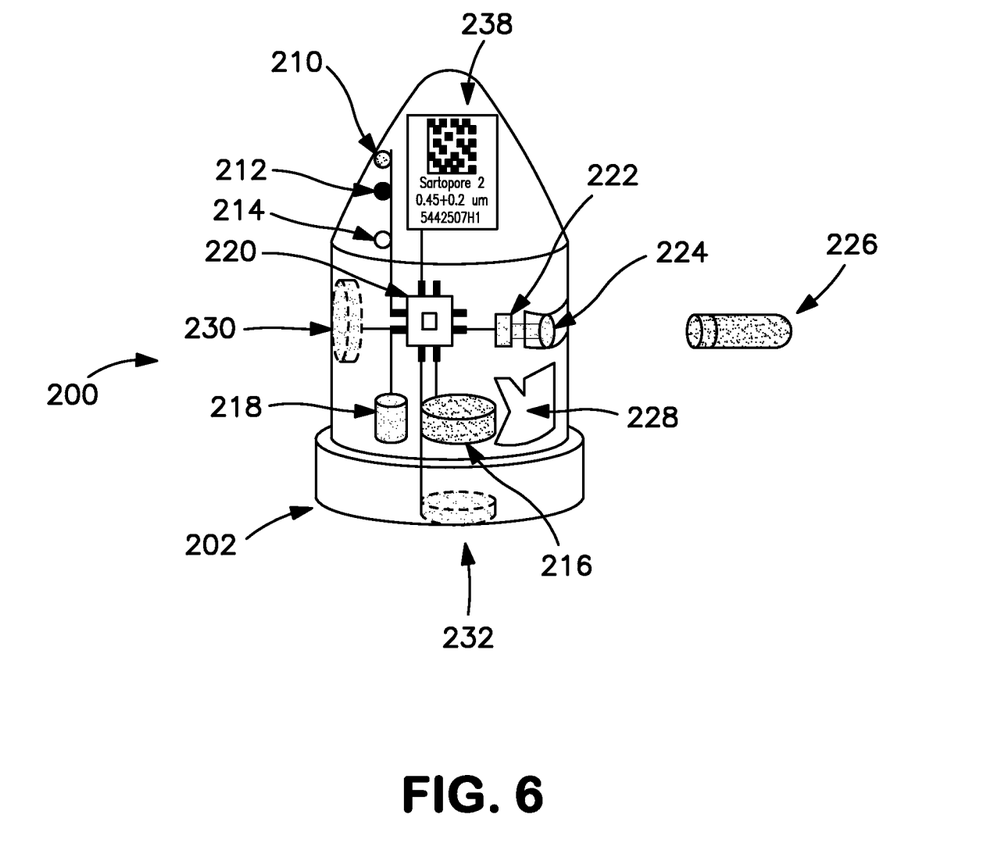
FIG. 6 illustrates another embodiment of a filter element attachment.

FIG. 6 shows another filter element attachment 200 with embedded sensors and electronics that can communicate using a dynamic visual display 238 and/or a light emitting device 210. In case a filter cartridge comprising the filter element attachment 200 is installed in a filter housing having a sight glass, the filter element attachment 200 enables a communication through the sight glass to a user and/or to an external communication device (not shown). The filter element attachment 200 may be molded and may include one or more enclosable cavities that can contain a plurality of electronic devices, sensors, and systems. The base 202 of the filter element attachment 200 can be welded to a filter element or filter cartridge. The filter element attachment 200 can include a dynamic and updateable visual display such as an electronic-ink display 238. This visual display can provide a user and/or an external communication device with information including but not limited to text, scanable barcodes, charts, animations, directions for use, specifications, re-order information, augmented reality visual markers, and standard operating procedures (SOP). The filter element attachment 200 can collect sensor data from a plurality of sensors including an pressure sensitive upstream sensor 230 and a pressure sensitive downstream sensor 232 located in the filter cartridge core. The sensor data can be transmitted to an internal processor 220, which can be stored by a storage device and/or datalogging device 218 and/or transmitted to a light emitting device which in this embodiment is an infrared LED 210 and/or a visual LED 212 and/or a dynamic visual display 238. A phototransistor or a light detector 214 embedded in the filter element attachment 200 can receive data transmitted from the external communication device in order to establish an optical communication link, which can be used for the connection handshake and as a checksum to ensure the integrity of the transmitted and received data. All of the internal components can be powered by an power source, such as an internal battery 216 or an external wireless power source (not shown). The internal electronic components can be switched using a magnetic key 226 that can actuate an internal switch 222 associated to an internal magnet 224 without a mechanical contact. The internal electronic components can be individually or collectively covered in a thermal insulation 228 in order to protect the electronics from the high heat during steam sterilization, autoclaving, or high temperature operation.

Figure 7:
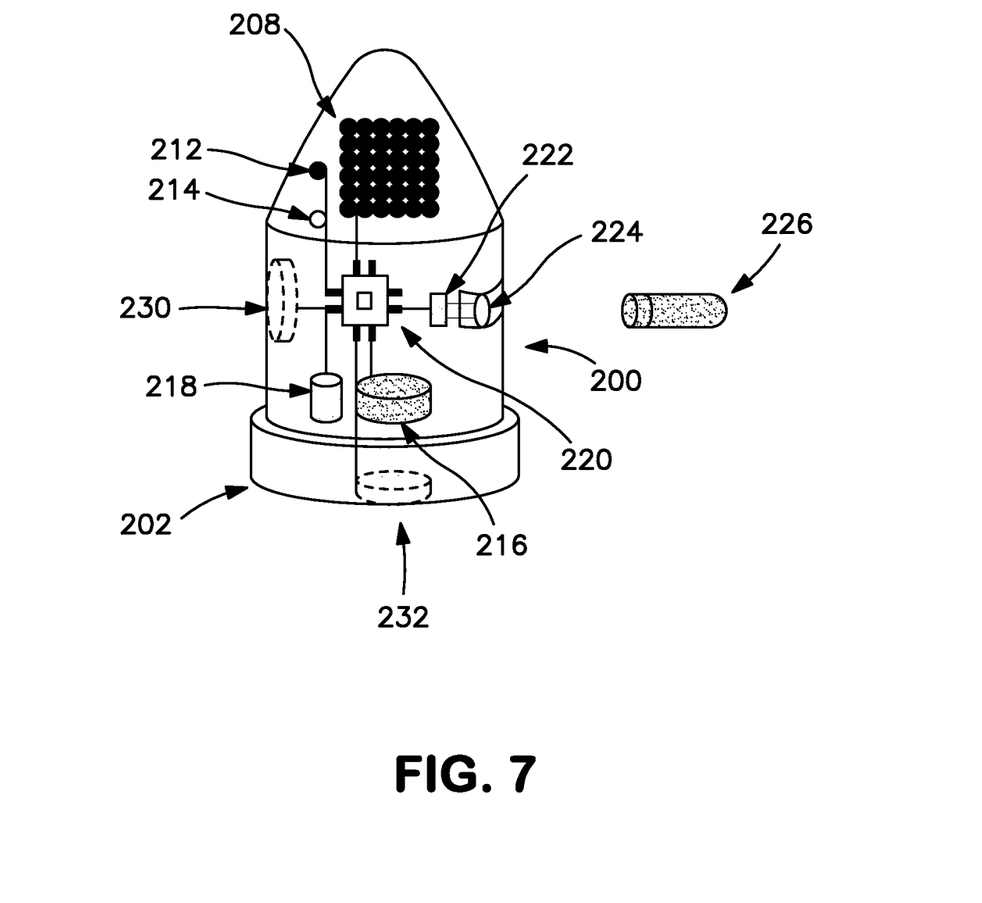
FIG. 7 illustrates further embodiment of a filter element attachment.

FIG. 7 shows a filter element attachment 200 with embedded sensors and electronics that can communicate by means of an optical communication link, exemplarily using an light emitting diode (LED) array 208. In case the filter element attachment 200 is mounted to the filter element to form the filter cartridge and the filter cartridge is position in a filter housing (not shown) having a sight glass, the LED array 208 can be observed through the sight glass of the filter housing by an external communication device. The external communication device may comprise an infrared detector in order to receive the optical signal send by the LED array 208. The filter element attachment 200 is molded including an enclosable cavity that can contain a plurality of electronic devices, sensors, and systems. The base 202 of the filter element attachment 200 can be mounted or welded to a filter element or filter cartridge. The filter element attachment 200, particularly the fin of it, can comprise an LED display 208 further comprising infrared LEDs or LEDs emitting visible light. The LED display can dynamically display information. In other words the displayed information can updated depending on display data generated by a processor 220. The display data may be dependent on sensor data sensed by one or more of the sensors of the filter element attachment 200. Thus, the can present data to the external communication device through text, symbols, dynamic images, animations, iconography, scanable barcodes, augmented reality markers, infrared light pulses or pulsating light patterns. The augmented reality markers recognized by the external communication device can be sent wirelessly to a mobile device and/or network and serve as link to information located on a local and/or networked database. A dynamically updatable two dimensional barcode display could also be used to provide the sensor data to the external communication device in real-time. From the communication device the data may be forwarded to an external processing device by means of a wired or wireless communication link. The filter element attachment 200 can collect sensor data from a plurality of sensors including an upstream sensor 230 and a downstream sensor 232 located in the filter cartridge core. The sensor data is transmitted to the internal processor 220, and may be stored by a storage device and/or a datalogging device 218 and/or may be transmitted to the light emitting device, which in this embodiment is an infrared LED array (208) and/or a visual LED 212. A phototransistor or detector 214 embedded in the filter element attachment 200 can receive data transmitted from the external communication device to establish an optical communication link, which can be used for the connection handshake and as a checksum to ensure the integrity of the transmitted and received data. All of the internal components can be powered by an internal battery 216 or an external wireless power source (not shown). The internal electronic components can be switched on using a magnetic key 226 that can activate an internal switch 222 by means of an internal magnet 224 all without any mechanical contact. The internal electronic components can be individually or collectively covered in a thermal insulation 228 to protect the electronics from the high heat during steam sterilization, autoclaving, or high temperature operation.

Figure 8A:
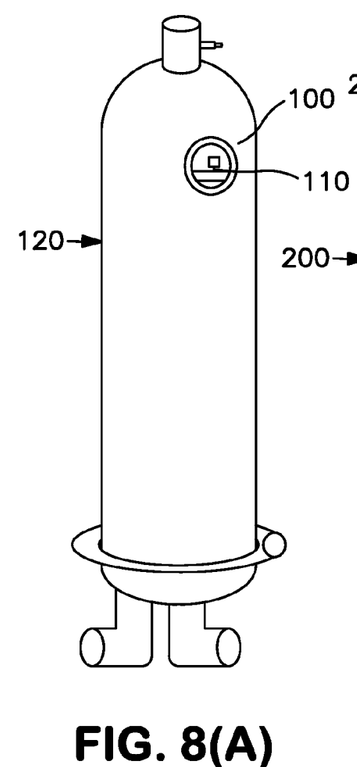
FIGS. 8A-8C shows an embodiment of a filter system with a sight glass through which an external communication and control device can send and receive visual data to and from the filter element attachment of the filter cartridge through the sight glass.
Figure 8B:
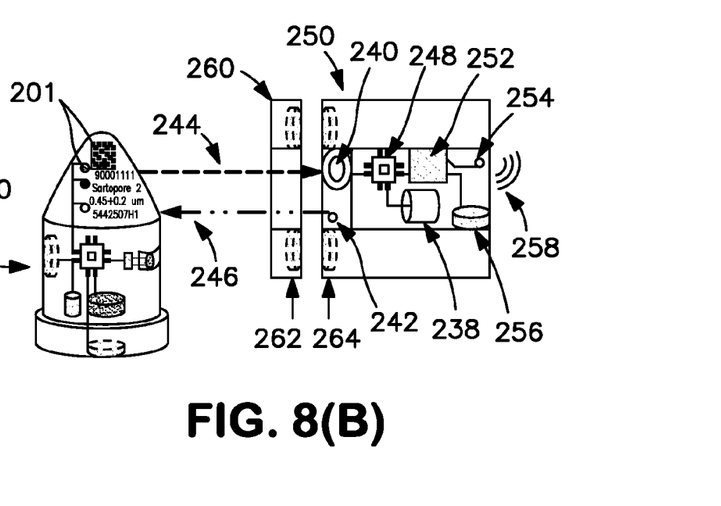
Figure 8C:
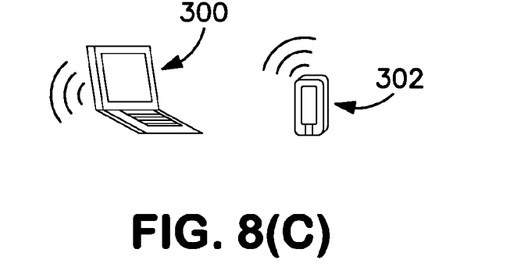

FIGS. 8A-8C shows an embodiment of a filter housing 120 with a sight glass 100 in which an external communication device 250 can send and receive visual data from the filter element attachment 200 of a filter cartridge 110 through the sight glass 100. FIG. 8A is a side view of the filter housing 120 with the sight glass 100, wherein the filter cartridge 110 is partly visible through the sight glass 100. In fact, a filter element attachment 200 (shown in FIG. 8B) is arranged at the filter cartridge 110 and filter cartridge and filter housing 120 are matching in this way, that the filter element attachment 200, in particular display means 201 are visible through the sight glass 100 of the filter housing 120.

FIG. IB is a side view of the filter element attachment 200 that is configured to transmit data by means of an optical communication link. In this embodiment the optical communication link can comprise sending pulses 244 of infrared radiation and/or visible light by means of the display means 201 through the sight glass 100 on the side wall 260 of the filter housing. An external communication device 250 can be removably attached to the side wall 260. For example, the communication device 250 mating with the external magnets 264 on the external communication device 250. The internal magnets may be surrounding the transparent part of the sight glass 100. The external communication device 250 includes a receiving device, which may be a high quality camera with an infrared filter 240, a processor 248 to analyze the received data, a data storage or datalogging device 238, and a communication device 252 which can transmit the data by wire or wirelessly by electromagnetic radiation 258 through an antenna 254.

FIG. 8C is a front view of a plurality of wireless devices 300, 302 that could receive the wireless data transmitted from the external communication device 250 including a mobile wireless device 302 and a wireless computing device 300, and a wireless network (not shown).

FIGS. 9A-9D shows an embodiment of a filter element attachment 200 with embedded sensors and electronics, as described above. The filter element attachment 200 is mounted to the filter element 270 by molding. Filter element 270 and filter element attachment 200 are integrated to a filter capsule 272, which is at least partly transparent, wherein the transparent part acts as a sight glass. The filter capsule 272 can also comprise a completely transparent capsule body. Particularly, the body of the filter capsule 272 can be transparent to visible light and/or transparent to infrared light.

Figure 9A:
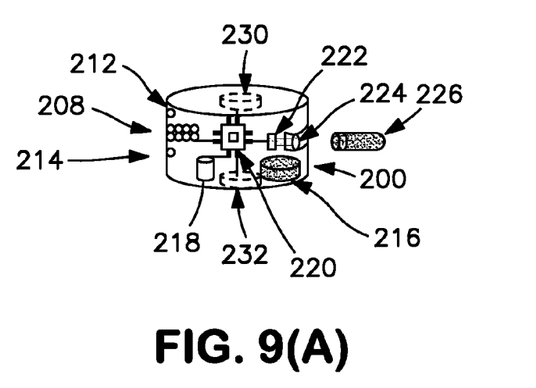
FIGS. 9A-9D shows another embodiment of a filter system.

FIG. 9A is a side view of the filter element attachment 200 including electronic devices, such as at least one sensor. The filter element attachment 200 is configured to collect sensor data from embedded sensors 230, 232 and communicate that data to an internal processor 220, store the data in a storage device and/or datalogging device 218 and transmit the data to an external communication device 250 via an optical communication link, for example by means of infrared LED array 208, as described with respect to FIGS. 5 to 8.

Figure 9B:
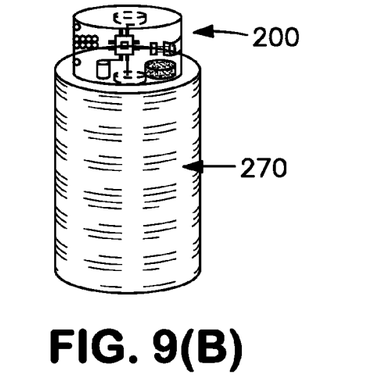

FIG. 9B is a side view of the electronic filter element attachment 200 that is welded or molded to the top of a filter element 270.

Figure 9C:
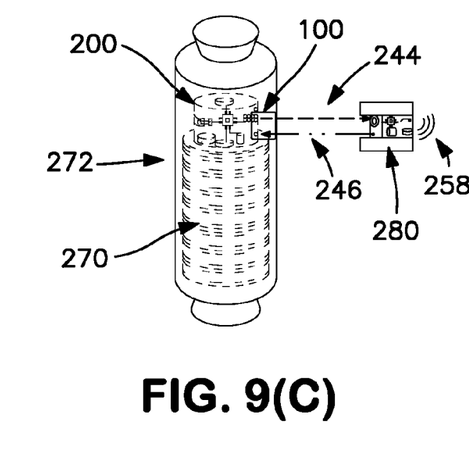

FIG. 9C is a side view of the filter element 270 with the electronic filter element attachment 200 that are integrally molded inside of a partly transparent filter capsule 272. The filter element attachment 200 can transmit and receive infrared data in pulses 244, 246 through the sight glass 100 on the side wall of the filter capsule 272 which is received by a remote external communication device 280. The remote external communication device 280 can be placed within the line of sight at some distance away from the filter capsule 272 and maintain communication with the internal filter element attachment 200. The remote external communication device 280 can transmit the data received to a wireless mobile device and/or network via electromagnetic radiation 258.

Figure 9D:
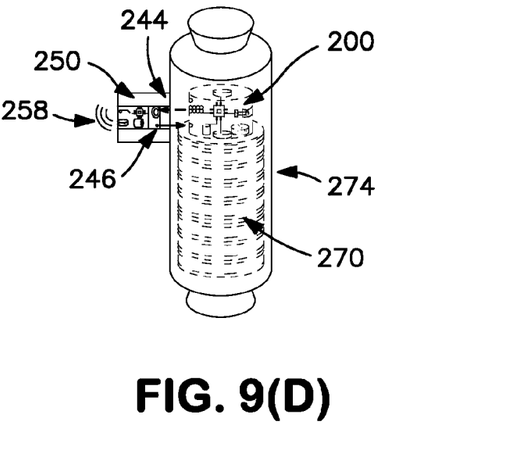

FIG. 9D is a side view of a filter element 270 with an electronic filter element attachment 200 mounted together and arranged inside of a transparent filter capsule 274. The electronic filter element attachment 200 can transmit and receive infrared data in pulses (244 and 246) through the transparent body of the filter capsule 274 which is received by a removably attached external communication device 250, as described above. The attached external communication device 250 can transmit the data received to a wireless mobile device and/or network via electromagnetic radiation 258.

What is claimed is:

1. A filter system comprising:
   a filter element (126, 270) for filtering a fluid;
   a filter element attachment (200) having a base (202) and at least one dynamic display (204, 206, 208, 210, 212, 238), the base (202) being directly attached to a part of the filter element (126, 270) and the at least one dynamic display (204, 206, 208, 210, 212, 238) being attached to the base (202), the at least one dynamic display (204, 206, 208, 210, 212, 238) being configured to display changeable information associated with a state of the filter element (126, 270) to which the base (202) is attached; and
   a filter housing (120) with at least one sight glass (100), the filter element (126, 270) and the filter element attachment (200) being removably disposed in the filter housing (120) so that a closed fluid space is defined between the filter element (126, 270) and the filter housing (120) and so that the changeable information that is displayed by the dynamic display (204, 206, 208, 210, 212, 238) can be monitored through the at least one sight glass (100) and so that both the fluid and a surface of the filter element (126, 270) in the closed fluid space are visible and can be monitored through the at least one sight glass (100), the sight glass (100) being configured to withstand pressure applied during filtering.

2. The filter system of claim 1, wherein the filter housing (120) comprises stainless steel.

3. The filter system of claim 1, wherein the sight glass (100) comprises a transparent polymer or a transparent metal.

4. The filter system of claim 1, wherein the sight glass (100) is formed as a prism or magnifier.

5. The filter system of claim 1, wherein the filter system is configured to provide an optical communication link through the sight glass (100) between an optical communication device of the filter element attachment (200) and an external optical communication device.

6. The filter system of claim 5, wherein the optical communication device of the filter element attachment (200) comprises one of an electronic ink display, an Liquid crystal (LCD) display, an LED display, a plasma display, a 3D display or a touchscreen display.

7. The filter system of claim 6, wherein the external optical communication device comprises one of a laser barcode scanner, a laser, an Infrared Light Emitting Diode (LED), a visual LED, an ultraviolet LED, a microwave, a radio wave, a photon or other light spectrum emitting device.

8. The filter system of claim 1, wherein the filter element attachment (200) comprises an electronic component, and said electronic component is remotely controllable by a controllable external control device.

9. The filter system of claim 8, wherein the controllable electronic component is one of a magnetic sensor, an optical sensor, an capacitive sensor and an electromagnetic sensor.

10. The filter system of claim 5, wherein the external optical communication device can be removably attached to an exterior of the sight glass (100) to establish a communication link to the filter element attachment (200).

* * * * *